July 14, 1942.  H. F. HONS, JR  2,289,497
COFFEE BREWER
Filed Jan. 24, 1940
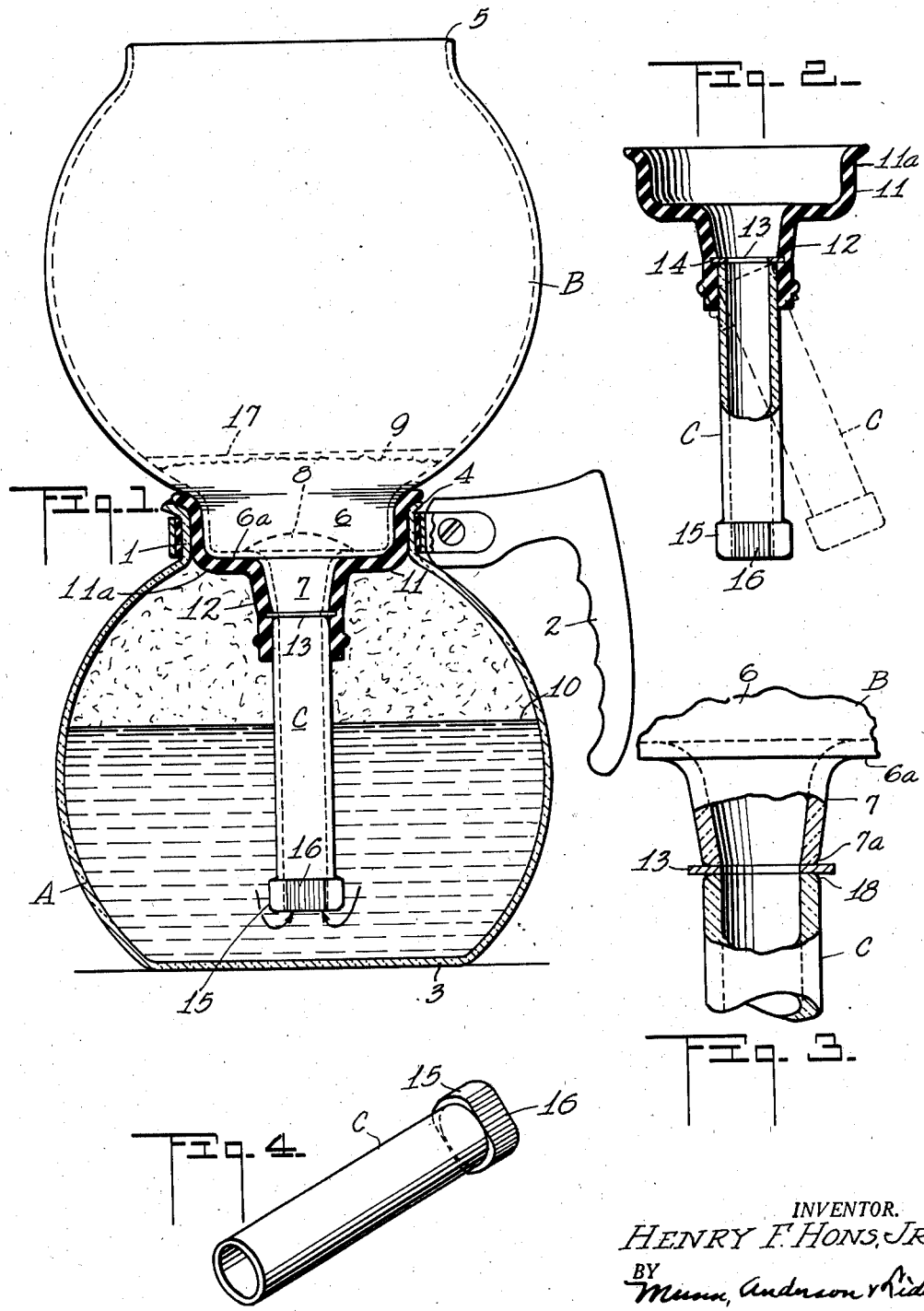
INVENTOR.
HENRY F. HONS, JR.
BY
Munn, Anderson & Liddy
ATTORNEYS.

Patented July 14, 1942

2,289,497

UNITED STATES PATENT OFFICE 2,289,497

COFFEE BREWER

Henry F. Hons, Jr., San Francisco, Calif.

Application January 24, 1940, Serial No. 315,316

2 Claims. (Cl. 53—3)

My invention relates to improvements in a coffee brewer, and it consists of the combinations, constructions and arrangements hereinafter described and claimed.

In the coffee brewer of the type using a lower glass receptacle for holding water and an upper glass receptacle for holding coffee, the upper receptacle has an integral tube extending down into the lower receptacle. The upper receptacle must act as a vapor-tight cover for sealing the lower receptacle when this type of brewer is used and frequently the lateral force necessary to remove it, causes the tube to strike the side of the lower receptacle and frequently break. Another disadvantage lies in the fact that the length of the tube and upper receptacle are so long as to prevent ready accommodation in a dish pan. This also results in frequent breakage of the tubular stem from the receptacle during the washing operation.

The principal object of my invention is to provide a stem for this type of coffee brewer which is removably secured to the upper receptacle so that it may be readily disconnected for washing purposes. The stem is removably secured to the receptacle by a rubber sleeve which will give freedom of angular movement between the stem and the upper receptacle. With this arrangement, when a lateral force is applied to the upper receptacle to remove it from the lower one, and should the tube strike the lower receptacle accidentally during this removal, there will be insufficient force to break the tube because the rubber sleeve will permit angular movement between the two parts.

The tube is also shaped to be prevented from rolling when placed on a supporting shelf after it is disconnected from the upper receptacle. The tube communicates with the upper receptacle and prevents any of the water from contacting with the rubber sleeve. The rubber sleeve performs the additional function of acting as a gasket between the upper and lower receptacles and makes an air-tight seal for the lower receptacle.

Other objects and advantages will appear in the following specification, and the novel features of the device will be particularly pointed out in the appended claims.

My invention is illustrated in the accompanying drawing forming a part of this application, in which Figure 1 is a side elevation of the device, portions being shown in section;

Figure 2 is a separate view of the gasket and removable tube, partly shown in section;

Figure 3 is an enlarged detail view showing the tube contacting with the reduced end of the upper receptacle; and Figure 4 is an isometric view of the tube.

In carrying out my invention, I provide a lower receptacle A, an upper receptacle B and a removably connected tube C to the upper receptacle in a manner hereinafter described. The lower receptacle A has a neck portion 1 and a handle 2 is secured to the neck. The receptacle A is preferably spherical in shape with a flat bottom 3 and the neck has an outwardly turned rim 4 for readily receiving the upper receptacle B.

The upper receptacle B is also spherical in shape and has an opening 5 in its top. The lower end of the receptacle B is formed into a cylindrical portion 6 and a reduced tubular extension 7 depends from this cylindrical portion and is axially aligned with the receptacle axis. The cylindrical portion 6 has a flat end 6a and the tubular extension 7 depends from this. A conventional filtering means indicated generally at 8 is used for holding the coffee shown at 9 in the upper receptacle and this filtering means permits the water 10 to be forced from the lower receptacle into the upper one to contact with the ground coffee and then to subsequently flow back into the lower receptacle.

A gasket 11 with a tubular sleeve 12 is clearly shown in Figure 2 and the flanged portion 11a of the gasket is forced over the cylindrical portion 6. The gasket is compressed between the cylindrical portion 6 and the inner surface of the neck 1 so that a water and vapor-tight seal is formed. The sleeve 12 encloses the glass tubular extension 7 and projects beyond the open end of the extension so as to receive the top of the tube C, see Figure 1. An aluminum washer 13 is preferably placed between the two adjacent ends and the sleeve 12 has an annular groove 14 for receiving the rim of the washer. The washer need not be provided, but it is preferably used as a safety precaution to prevent the glass tube C from directly contacting with the end of the glass tubular extension 7. The gasket 11 is preferably made of rubber and the sleeve 12 permits the tube C to swing into angular positions as shown in Figure 2. The sleeve 12 frictionally holds the tube C in place, but permits it to be readily removed.

The tube C may be shaped to prevent its rolling after it is removed from the sleeve and placed on a supporting surface. In Figure 4 I show the tube C with an enlarged end 15 and two flat sides 16. Either of these flat sides when contacting with the supporting surface will prevent the tube from rolling.

From the foregoing description of the various parts of the device, the operation thereof may be readily understood.

The device is used in the usual manner when brewing coffee, care being taken that the water level 10 in the lower receptacle does not reach the lower end of the sleeve 12. The device is placed over a fire or on an electric burner and when the proper water temperature is reached, a sufficient vapor pressure will be developed in the top of the lower receptacle to force the water upwardly through the tube C and into the upper receptacle B where it will come into intimate contact with the ground coffee 9. Figure 1 shows the water entering the upper receptacle with the water level 17 just submerging all of the coffee 9. When sufficient water passes from the lower receptacle to the upper one, the water level in the lower receptacle will drop below the tube C and the trapped steam will pass through the tube and prevent further water flow into the upper receptacle. The heat to the receptacle A is now turned off and the subsequent cooling of the air in this receptacle will create a vacuum which will cause the brewed coffee to return to the lower receptacle.

When now the upper receptacle is removed from the lower one, a twisting or a lateral moving of the upper one with respect to the lower will result in the freeing of the gasket 11 from the neck 1. Should the tube C accidentally strike the lower receptacle during this removal operation, it will not be broken, because the rubber sleeve 12 will permit its ready swinging into angular positions as shown in Figure 2. The tube C may now be disconnected from the receptacle B and laid up on a supporting surface. Both the receptacle B and the tube C may be washed separately and this will reduce the chance of breakage.

It should be noted that at no time does the liquid come into direct contact with the gasket or sleeve because even while it flows through the tube C and the portion 7, the washer 13 contacts with both these parts and keeps the liquid away from the rubber. If desired, the portion 7 may have a rounded edge 7a and the tube C may have a rounded edge 18 to permit a more ready angular swinging between the tube and the upper receptacle.

While I have shown only the preferred form of my invention, it should be understood that various changes or modifications may be made within the scope of the appended claims without departing from the spirit of the invention,

I claim:

1. In a coffee brewer, an upper glass receptacle having a tubular depending portion, a glass tube having the same diameter as and being disposed in alignment with the tubular portion, a flexible sleeve connecting the tube to the depending portion and permitting a slight angular movement between the parts, and a shock-absorbing washer placed between the tube and the depending portion.

2. In a coffee brewer, an upper glass receptacle having a tubular depending portion, a glass tube having the same diameter as and being disposed in alignment with the tubular portion, a flexible sleeve connecting the tube to the depending portion and permitting a slight angular movement between the parts, and a shock-absorbing washer placed between the tube and the depending portion, said sleeve having means for retaining the washer when the tube is removed.

HENRY F. HONS, Jr.